(12) United States Patent
Wang et al.

(10) Patent No.: US 8,283,408 B2
(45) Date of Patent: Oct. 9, 2012

(54) THERMOPLASTIC-TOUGHENED CYANATE ESTER RESIN COMPOSITES WITH LOW HEAT RELEASE PROPERTIES

(75) Inventors: Yen-Seine Wang, Dublin, CA (US); Yi-Jui Wu, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 254 days.

(21) Appl. No.: 12/713,534

(22) Filed: Feb. 26, 2010

(65) Prior Publication Data

US 2011/0212292 A1     Sep. 1, 2011

(51) Int. Cl.
  *C08G 18/28* (2006.01)
  *C08G 59/14* (2006.01)
  *C08L 79/04* (2006.01)

(52) U.S. Cl. ........ 524/538; 525/420; 525/424; 525/432; 525/436

(58) Field of Classification Search .................. 524/538; 525/420, 424, 432, 436
  See application file for complete search history.

(56) References Cited

U.S. PATENT DOCUMENTS

| | | | |
|---|---|---|---|
| 4,902,752 | A | 2/1990 | Shimp |
| 5,527,838 | A | 6/1996 | Afzali-Ardakani et al. |
| 6,365,671 | B1 | 4/2002 | Lin et al. |
| 7,342,085 | B2 | 3/2008 | Keller et al. |
| 2005/0182203 | A1 | 8/2005 | Sugano et al. |

FOREIGN PATENT DOCUMENTS

| | | |
|---|---|---|
| EP | 0412827 B1 | 12/1997 |
| EP | 0945477 | 9/1999 |
| JP | 2003-128785 | 5/2003 |
| WO | 2010/042369 | 4/2010 |

OTHER PUBLICATIONS

Eamor Woo, et al., Model With Experimental Evidences for the Morphology of Binary Blends of a Thermosetting Polycyanate With Thermoplastics:, Macromolecules, American Chemical Society, vol. 27, No. 19 (Dec. 19, 1994).

*Primary Examiner* — Ana Woodward
(74) *Attorney, Agent, or Firm* — W. Mark Bielawski; David J. Oldenkamp

(57) ABSTRACT

Composite materials that contain thermoplastic-toughened cyanate ester resins as the resin matrix. The composite materials exhibit low levels of heat release when burned. The matrix resins are composed of from 50 to 80 weight percent of a cyanate ester resin component. The matrix resin composition also includes from 10 to 40 weight percent of a thermoplastic blend that is composed of polyetherimide and polyamideimide. The epoxy resin composition further includes from 1 to 10 weight percent of a curative agent. The composite materials may be used for primary structures in aircraft and other load-bearing structures.

9 Claims, 3 Drawing Sheets

THERMOPLASTIC-TOUGHENED CYANATE ESTER RESIN COMPOSITES WITH LOW HEAT RELEASE PROPERTIES

BACKGROUND OF THE INVENTION

1. Field of the Invention

The present invention relates generally to composite materials that contain a thermoplastic-toughened cyanate ester resin as the resin matrix. These high-strength composites are suitable for use as primary structures in aircraft and other load-bearing applications. The present invention is directed to the properties of such composite materials when they are burned. In particular the invention involves providing such thermoplastic-toughened cyanate ester composites that have low heat release properties and short self-extinguishing times.

2. Description of Related Art

Cyanate ester resins that are reinforced with a fibrous material, such as glass or carbon fiber, are used in a wide variety of situations where high structural strength and low-weight are required. Composite materials that use a high performance cyanate ester resin matrix are especially popular in the aerospace industry where weight and structural strength are important engineering and design considerations. High performance cyanate ester resins typically include one or more thermoplastic materials that provide "toughening" of the cyanate ester resin. Although such high performance cyanate ester resin composite materials are desirable because of their relatively high strength to weight ratio, they do present some specific issues with respect to heat release, flammability and other burn properties.

A major goal in developing formulations for high performance cyanate ester resin composites is to limit the amount of heat that is released during burning, while at the same time not reducing the structural strength of the cured composite part. This is especially important for primary structures and parts that are located in the interior areas of aircraft. It is also important that any attempt to reduce heat release does not adversely affect properties of the uncured cyanate ester resin, such as tack and viscosity. The tack and viscosity of the uncured resin are especially important when the cyanate ester resin is used to make prepreg, which is a common intermediate material used in the fabrication of aerospace parts.

Heat release requirements for composite materials, which are used in the interior of aircraft, are set forth in the Federal Aviation Administration (FAA) Aircraft Materials Fire Test Handbook (14 C.F.R 25.853(d), Appendix F, Part 1) and BOEING Specification Support Standard BSS-7322. The total rate of heat release during combustion of a test sample is measured as well as the peak heat release rate during the burning process. The standard test used to determine the heat release requirements for composite materials exposed to radiant heat is the Ohio State University (OSU) heat release test. It is desirable to provide cyanate ester resin composites that have an average OSU total heat release rate at two minutes of less than 65 kilowatt-minutes per square meter (kw-min/m$^2$) and a peak OSU heat release rate that is less than 65 kw-min/m$^2$. These two OSU values are the minimum requirements set by 14 C.F.R. 25.853(d), Appendix F Part IV, for interior aircraft parts made from composite materials.

Resistance to surface flammability is also an important area of concern for high performance cyanate ester resin composites. It is important that a cyanate ester resin composite part, which is on fire, be able to self-extinguish once the source of heat and/or flame is removed. The ability to self-extinguish is an especially important consideration for primary structures and parts located in the interior areas of aircraft. It is also a significant goal of cyanate ester resin formulators to develop cyanate ester resins that are used to make composites which self-extinguish in as short a time period as possible, while at the same time keeping structural strength of the finished composite part at the levels needed for aerospace applications. The same requirement that the tack and viscosity of the uncured cyanate ester resin not be adversely affected applies with respect to attempts to formulate cyanate ester resins with short self-extinguishing times.

The United States Federal Aviation Administration has established regulations and requirements for fire resistance of aircraft interior parts and materials. These requirements are set forth in 14 C.F.R. 25.853(a). One requirement is that the composite material be able to self-extinguish once the flame source is removed. The test procedure for measuring the self-extinguishing time for cyanate ester resins are also set forth in the FAA Aircraft Materials Fire Test Handbook (FAR 25.853, Appendix F, Part 1) and in BOEING Specification Support Standard BSS-7230 (Revision H), which is recognized in the aerospace industry as a standard test method. It would be desirable to provide high performance cyanate ester resin composites where the self-extinguishing times are as short as possible and at least below 15 seconds. A 15 second self-extinguishing time is the maximum allowed for composite aircraft parts pursuant to 14 C.F.R. 25.853(a).

SUMMARY OF THE INVENTION

In accordance with the present invention, it was discovered that cyanate ester resin compositions, which have a particular blend of thermoplastic toughening agents, can be combined with a fibrous support and cured to provide composite materials that have low OSU heat release rates and short self-extinguishing times when compared to existing high performance toughened cyanate ester resin composites.

The compositions of the present invention are composed of a fibrous reinforcement and a resin matrix that contains from 50 to 80 weight percent of a cyanate ester resin component that includes one or more cyanate ester resins. The matrix resin also includes from 10 to 40 weight percent of a thermoplastic blend comprising polyetherimide and polyamideimide wherein the weight ratio of polyetherimide to polyamideimide is from 5:1 to 1:1. A curative agent in an amount ranging from 0 to 10 weight percent is also included.

The present invention covers prepreg and other compositions that include the uncured or partially cured resin matrix and a fibrous reinforcement. In addition, the invention covers cured composite parts where the resin matrix has been cured. The composite parts are well-suited for use as primary structure in aircraft and other load-bearing applications where high strength is required. Parts and structures made using composite materials in accordance with the present invention are particularly well-suited for use as primary structures that are located in the interior of aircraft.

The invention also covers methods for making compositions that contain uncured matrix resin and fibrous support as well as the cured parts and products that incorporate the matrix resin composition.

The above described and many other features and attendant advantages of the present invention will become better understood by reference to the following detailed description when taken in conjunction with the accompanying drawings.

DETAILED DESCRIPTION OF THE INVENTION

Matrix resin compositions in accordance with the present invention may be used in a wide variety of situations where a thermoplastic-toughened cyanate ester resin is desired. Although the cyanate ester resin compositions may be used alone, the compositions are generally combined with a fibrous support to form composite materials. The composite materials may be in the form of a prepreg or cured final part. Although the composite materials may be used for any intended purpose, they are preferably used in aerospace vehicles and particularly preferred for use in commercial and military aircraft. For example, the composite materials may be used to make non-primary (secondary) interior aircraft structures, such as aircraft galley and lavatory parts and as window frames, floor panels, overhead storage bins, wall partitions, wardrobes, ducts, ceiling panels and interior sidewalls. In addition, the composite materials may be used to make primary aircraft structures. Primary aircraft structures or parts are those elements of either fixed-wing or rotary wing aircraft that undergo significant stress during flight and which are essential for the aircraft to maintain controlled flight. The composite materials may also be used to make "load-bearing" parts and structures in general.

Figure 1:
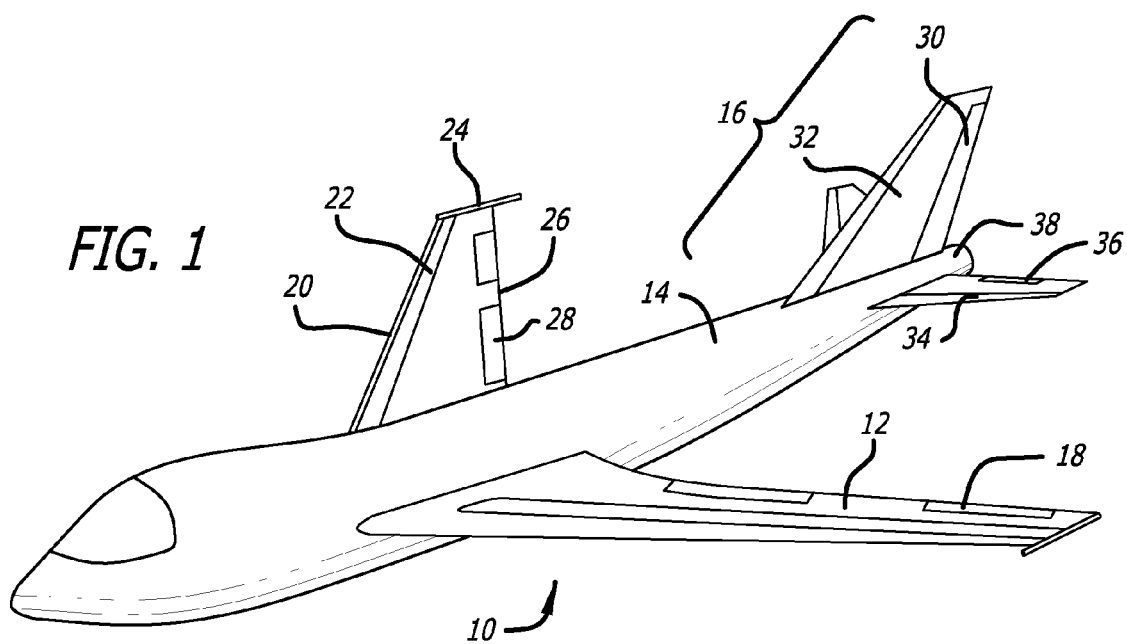
FIG. 1 is a perspective view of an aircraft, which depicts exemplary exterior primary aircraft structures that can be made using composite materials in accordance with the present invention.
Figure 2:
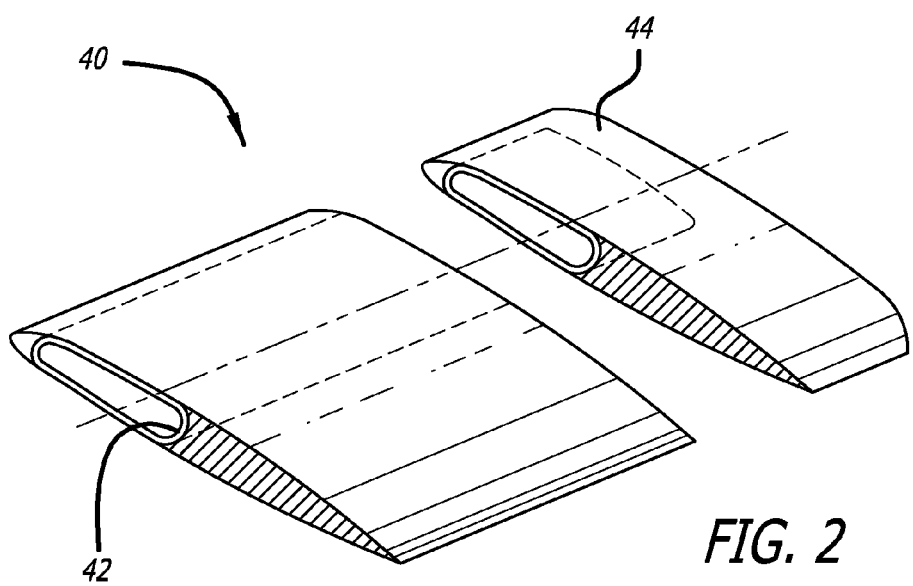
FIG. 2 is a partial view of a helicopter rotor blade, which depicts exemplary exterior primary aircraft structures that can be made using composite materials in accordance with the present invention.

FIG. 1 depicts a fixed-wing aircraft at 10 that includes a number of exemplary primary aircraft structures and parts that may be made using composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

Figure 3:
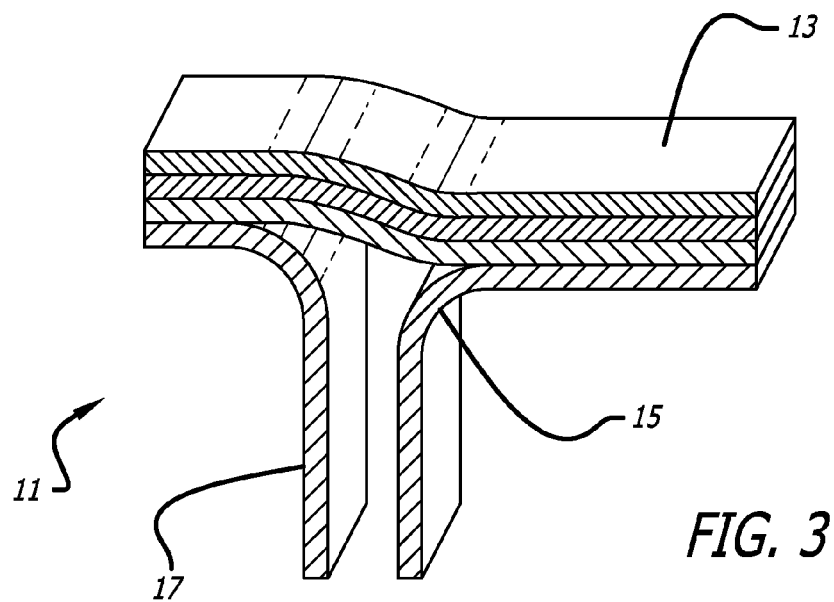
FIG. 3 is a simplified view of an exemplary T-stiffener structure that can be made using composite materials in accordance with the present invention. The T-stiffener is a primary structure that is used in the interior of aircraft.

The composite materials of the present invention are particularly well-suited for making primary aircraft structures that are located in the interior of the aircraft where low OSU heat release values and short self-extinguishing times are an especially important consideration. An exemplary T-stiffener 11, which is a primary structure that is located in the interior of the aircraft, is shown in FIG. 3. The T-stiffener 11 is made up of horizontally oriented layers 13 of composite material that form the flange portion of the stiffener and L-shaped layers of composite material 15 and 17 that form the rib portion of the T-stiffener. The T-stiffener 11 may include holes (not shown) for attaching the T-stiffener to the flange and rib surfaces using bolts or rivets to provide stiffening of the flange-rib assembly.

Figure 4:
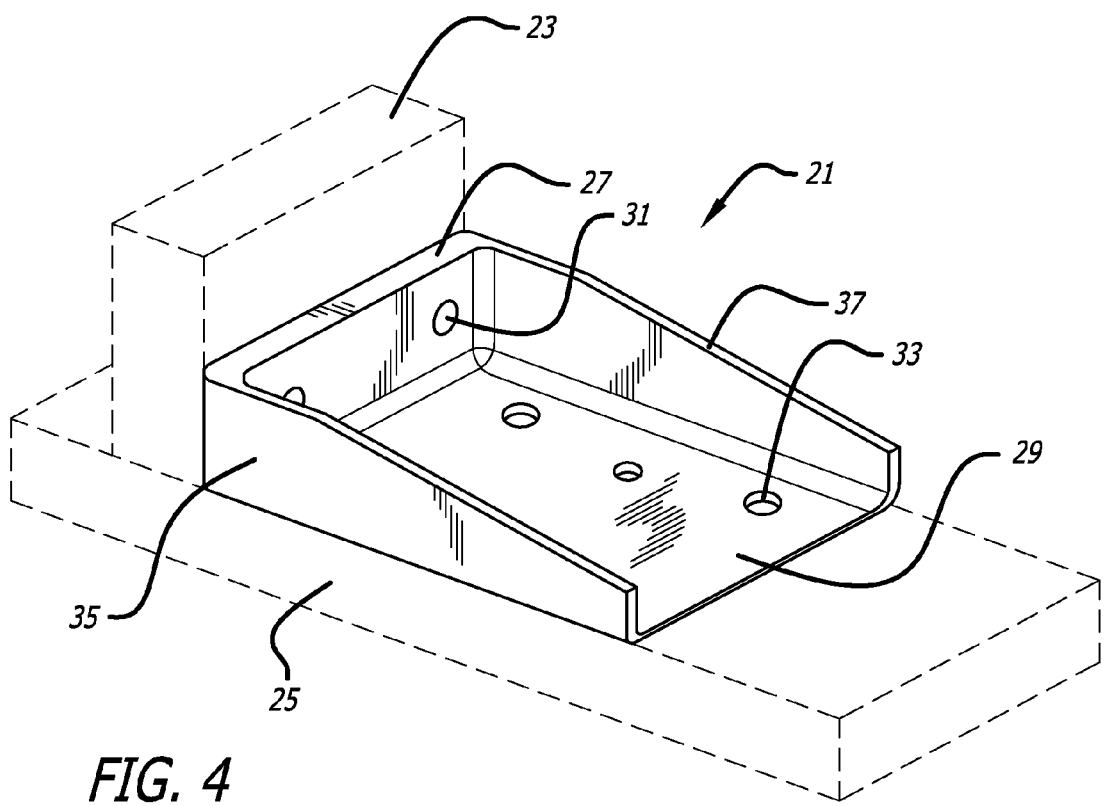
FIG. 4 is a simplified view of an exemplary cargo floor flange structure that can be made using composite materials in accordance with the present invention. The cargo floor flange is a primary structure that is used in the interior of aircraft.
Figure 5:
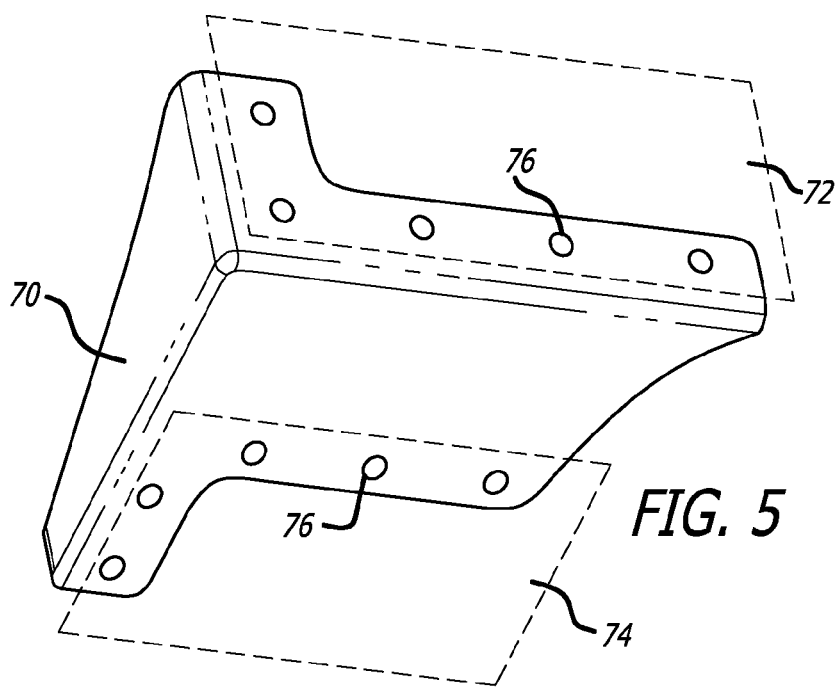
FIG. 5 is a simplified view of an exemplary aircraft clip structure that can be made using composite materials in accordance with the present invention. The clip is a primary structure that is used in the interior of aircraft.

Another exemplary interior primary aircraft structure, which can be made using composite materials in accordance with the present invention, is a cargo floor flange support, as shown at 21 in FIG. 4. The cargo flange support 21 is used to connect the cargo floor represented in phantom at 23 to the aircraft fuselage represented in phantom at 25. The cargo flange support 21 includes a first flange portion 27 and second flange portion 29, both of which include holes (31 and 33, respectively) for attachment to the aircraft. The cargo floor flange support 21 also includes reinforcing ribs 35 and 37, which provide needed stiffness and structural strength to the part. An exemplary aircraft clip structure is shown at 70 in FIG. 5. The clip structure 70 is designed to connect two primary interior structures together. The two primary aircraft structures are shown in phantom at 72 and 74. Holes 76 are provided for connecting the clip 70 to the primary structures using bolts or rivets.

Figure 6:
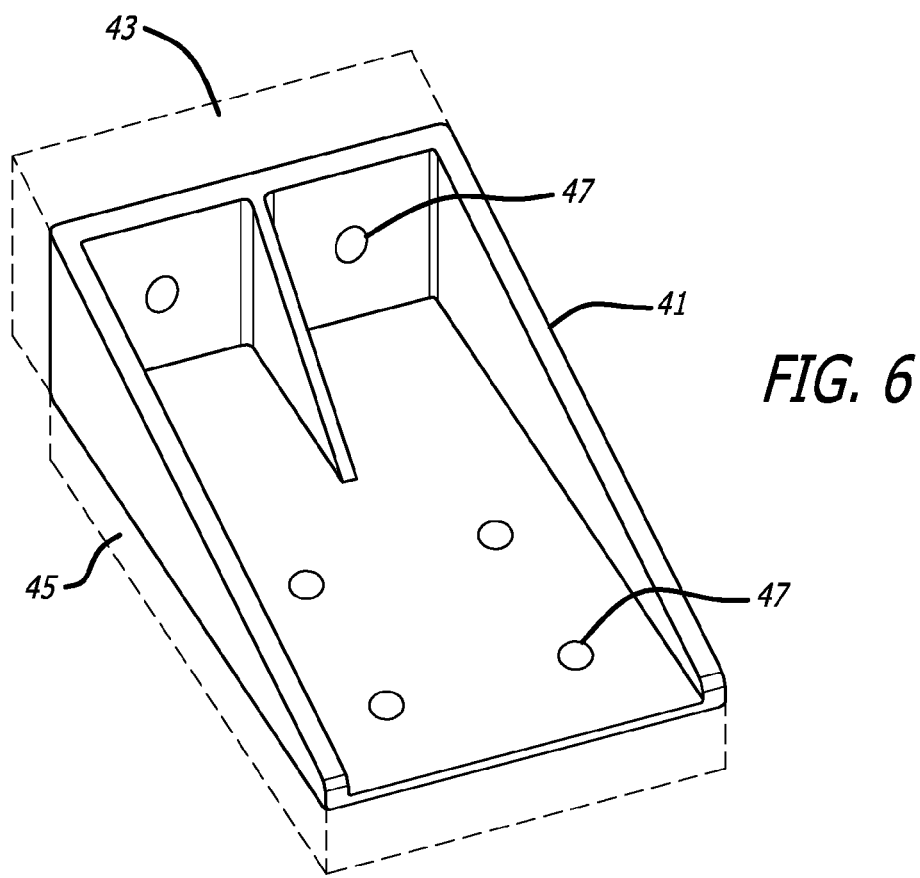
FIG. 6 is a simplified view of an exemplary flange support structure that can be made using composite materials in accordance with the present invention. The flange support is a primary structure that is used in the interior of aircraft.

Another exemplary interior primary aircraft structure, which can be made using composite materials in accordance with the present invention, is a flange support structure 41 that is shown in FIG. 6. The flange support structure 41 is designed to connect two primary aircraft parts together. The two aircraft parts 43 and 45 are shown in phantom in FIG. 6. The aircraft parts 43 and 45 are connected to the flange support 41 by way of bolting or riveting through holes 46 or by adhesive bonding The resin composition that is used to form the resin matrix includes from 50 to 80 weight percent of a cyanate ester resin component comprising one or more cyanate ester resins. Preferably, the resin matrix will include from 55 to 65 weight percent of the cyanate ester resin component. The cyanate ester resins that make up the cyanate ester resin component may be any of the cyanate ester resins that are amenable to thermoplastic toughening. Such cyanate ester resins are well-known in the aerospace industry. Exemplary cyanate ester resins include bisphenol-E cyanate ester resin, bisphenol-A cyanate ester resin, hexafluorobisphenol-A cyanate ester resin, tetramethylbisphenol-F cyanate ester resin, bisphenol-C cyanate ester resin, bisphenol-M cyanate ester resin, phenol novolac cyanate ester resin and dicyclopentadienyl-bisphenol cyanate ester resin. Bisphenol-E cyanate ester resins are preferred. The relative amounts and types of cyanate ester resins used in a particular resin composition may be varied. However, in a preferred embodiment, bisphenol-E cyanate ester resin is used as the sole cyanate ester resin in the cyanate ester resin component.

Cyanate ester resins are available commercially from a number of sources. For example bisphenol-E cyanate ester resin is available from Huntsman under the trade name AroCy L-10. Bisphenol-A cyanate ester resin, hexafluorobisphenol-A cyanate ester resin and tetramethylbisphenol-F cyanate ester resin are also available from Huntsman under the trade names AroCy B-10, AroCy F-10 and AroCy M-10, respectively. Bisphenol-C cyanate ester resin, bisphenol-M cyanate ester resin, phenol novolac cyanate ester resin and dicyclopentadienyl-bisphenol cyanate ester resin are available from Huntsman under trade names AroCy RD98-228, AroCy XU-366, AroCy XU-371 and XU-71787.02L.

The matrix resin composition also includes from 10 to 40 weight percent of a thermoplastic blend comprising polyetherimide (PEI) and polyamideimide (PAI). It is preferred that the matrix resin composition contain from 20 to 30 weight percent of the thermoplastic blend. The thermoplastic blend in accordance with the present invention includes one thermoplastic compound (i.e. PEI) that is soluble in the cyanate ester resin component and the other (i.e. PAI) that is not soluble in the cyanate ester resin component. The relative amounts of PEI and PAI may be varied between weight ratios (PEI: PAI) of 5:1 to 1:1. Preferably, the weight ratios (PEI: PAI) will vary between 4:1 and 2:1. It was found that the total and relative amounts of PEI and PAI within these ranges provides an effective way to reduce both the maximum (peak) and total heat release rates for composites containing thermoplastic toughened cyanate ester resins as the resin matrix.

Polyetherimide is available commercially as ULTEM 1000P from Sabic (Dubai). Polyamideimide is available commercially as TORLON 4000T or TORLON 4000TF from Solvay Advanced Polymers (Alpharetta, Ga.). PEI thermoplastics are typically supplied as powders where the PEI particles range in size from about 30 to 300 microns. The particle size of the PEI particles is not particularly important, since the PEI powder is dissolved in the cyanate ester component during preparation of the resin composition. Commercially available PAI powders typically have average particle sizes 50 μm.

The matrix resin composition is prepared by mixing the PEI particles and PAI particles with the cyanate ester resin component and heating the resulting mixture to a temperature of around 95° C. for a sufficient time to completely dissolve the PEI particles. The PAI particles do not dissolve. The time necessary for the PEI particles to dissolve will vary from 10 minutes to one hour or more depending upon the size of the PEI particles and the dissolution temperature. If desired, the PEI particles may be dissolved first and then the PAI particles are added.

After the PEI particles are dissolved, the mixture is cooled to 90° C. or below and the curative agent component (and PAI particles, if not previously added) is added to form a resin composition that is ready for combination with a fibrous support and curing. The particle size and amount of PAI is selected so that the viscosity of the cyanate ester resin composition is within a range that is suitable for prepreg preparation. The preferred average particle size range for the PAI particles is from 8 microns to 20 microns. Accordingly, it is preferred that commercially available PAI powder be ground or otherwise processed in order to provide a powder having the desired smaller particle size. It is preferred that the viscosity of the resin be the same as the viscosity of existing high performance toughened resins that are presently used in the aerospace industry to make prepreg including quasi-isotropic chopped prepreg.

The amount of curative agent component that is added to the cooled mixture of cyanate ester resin component and thermoplastic blend is from 0 to 10 weight percent of the total weight of the cyanate ester resin composition and preferably from 2 to 5 weight percent. Any of the curative agents that are used to provide curing of thermoplastic-toughened cyanate ester resin may be used to cure the resin composition. Exemplary curative agents in accordance with the present invention include bisphenol sulfone and bisphenol A. The resin may be cured without the using a curative agent, if desired.

The cyanate ester resin composition may also include additional ingredients, such as performance enhancing and/or modifying agents provided that they also do not adversely affect the viscosity and tack of the uncured resin so as to make it unsuitable for making prepreg. The cyanate ester resin composition also contains from 1 to 15 weight percent of a compatible fire retardant agent. The fire retardant agent is a cyanate ester resin that includes phosphorous in the back bone of the cyanate ester resin. Such phosphorous-containing cyanate ester resin fire retardant agents are well-known in the art. The amount of fire retardant that is added may be varied. However, it is preferred that the amount of fire retardant that is added be at least sufficient to insure that the maximum and total OSU heat release rates are below at least 65 kw-min/m². Preferred amounts of such phosphorous-containing cyanate ester resin are in the range of 8 to 12 weight percent of the total resin composition.

Phosphorous-containing cyanate ester resin fire retardants are available commercially from a number of sources. It is preferred that the cyanate ester resin contain from 5 to 15 weight percent phosphorous in the polymer backbone. An exemplary fire retardant is Primaset FR-300, which is available from LONZA (Basel, Switzerland). FR-300 is a crystalline solid that has a molecular weight of 374 and a melting point of 135° C. FR-300 has a phosphorous content of about 9 weight percent and a gel time at 200° C. of over 20 minutes. The glass transition temperature ($T_g$) is over 300° C. and the exotherm (DSC) is 206° C. FR 300 is a preferred phosphorous-containing cyanate ester resin fire retardant.

The cyanate ester resin compositions of the present invention are made in accordance with standard resin processing procedures for high performance toughened cyanate ester resins. The cyanate ester resin or resins are mixed together at room temperature or at an elevated temperature to melt crystals. The PEI and PAI portions of the thermoplastic component are then added. This mixture is then heated as previously described to a temperature at which the PEI is dissolved. The mixture is then cooled down to 90° C. or below and the curative agent (if any), the phosphorous-containing cyanate ester resin fire retardant and other additives (if any), are mixed into the resin to form the final resin composition that is impregnated into the fiber reinforcement to form the resin matrix.

The cyanate ester resin composition is applied to the fibrous reinforcement in accordance with any of the known prepreg manufacturing techniques. The fibrous reinforcement may be fully impregnated with the cyanate ester resin composition. The prepreg is typically covered on both sides with a protective film and rolled up for storage and shipment at temperatures that are typically kept well below room temperature to avoid premature curing. Any of the other prepreg manufacturing processes and storage/shipping systems may be used, if desired.

The fibrous reinforcement of the prepreg may be selected from hybrid or mixed fiber systems that comprise synthetic or natural fibers, or a combination thereof. The fibrous reinforcement may be any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The fibrous reinforcement may be in a woven, non-crimped, non-woven, unidirectional, or multi-axial textile structure form, such as quasi-isotropic chopped pieces of unidirectional fibers. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France). For example, plain weave carbon fiber fabrics identified as AGP193-P and SGP193-P are suitable fibrous reinforcements that are commercially available from Hexcel Reinforcements.

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing. The amount of resin matrix (resin content) in the prepreg may vary from 20 to 60 weight percent of the total prepreg weight. Resin contents on the order of 30 to 45 weight percent are preferred.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. with curing temperatures of between about 175° C. and 185° C. being preferred. Curing times and temperatures may be varied depending upon the amount (if any) and type of curative agent that is present in the resin composition. Compression molding of quasi-isotropic chopped prepreg or molding material that contain the thermoplastic-toughened cyanate ester resin is a preferred procedure. The quasi-isotropic chopped prepreg is the same as HexMC® compression molding material that is available from Hexcel Corporation (Dublin, Calif.), except that the resin component of this quasi-isotropic chopped prepreg is made in accordance with the present invention. Such quasi-isotropic materials are described in EP 113431 B1 and U.S. patent application Ser. No. 11/476,965. Unidirectional prepreg, alone or in combination with woven prepreg or quasi-isotropic chopped unidirectional prepreg is also a preferred material for making load bearing parts. Unidirectional fiber tape is available from a variety of commercial sources. For example AS4GP unidirectional fiber tape is available from Hexcel Corporation (Dublin, Calif.).

It is preferred that the composite part be post-cured at a temperature of 190° C. to 220° C. for at least one hour. It was found that post-curing of composite materials in accordance with the present invention provides additional lowering of the heat release rates as compared to composite materials that are not post-cured. Post-curing is preferably conducted in a convection oven. However, any suitable post-curing procedure may be used. It is preferred that the composite material be post-cured at about 200° C. for about 2 hours.

Cyanate ester resin compositions of the present invention will have the viscosity and tack that is required in order for the resin to be used in the formation of prepreg. The viscosity of the resin compositions should be similar to existing high performance toughened epoxy resins, such as HexPly® resins 8552. The tack should be sufficiently low to allow the prepreg to be handled for transport and storage, while at the same time being sufficiently high to allow multiple layers of prepreg to be applied and used with molds in accordance with known prepreg molding/curing procedure. When used as the resin matrix for a molding compound, such as quasi-isotropic chopped prepreg, the resin should have viscosity and tack properties that are similar to existing matrix resins, such as HexPly® resins 8552.

Preferred resin compositions have the following formulation:

55 to 65 weight percent bisphenol-E cyanate ester resin;
20 to 30 weight percent thermoplastic blend of PEI:PAI (4:1 to 2:1);
8 to 12 weight percent phosphorous-containing cyanate ester resin fire retardant agent
0 to 5 weight percent bisphenol sulfone These preferred resin compositions, when used as the resin matrix for composite material, provide maximum and total OSU heat release rates that are well below the 65 kw-min/m$^2$ heat release rate maximums set by 14 C.F.R. 25.853(d) and self-extinguishing time limit of 15 seconds set by 14 C.F.R. 25.853(a), while still retaining desired prepreg handling properties in accordance with the present invention. When these preferred resins are used to make composite parts that form primary aircraft parts or structures, it is preferred that the fibrous reinforcement is made from carbon fibers and that the prepreg is subjected to post-curing.

Particularly preferred epoxy resin compositions are those that have the following formulation: 1) a cyanate ester resin component made up of from 58 to 62 weight percent of AroCy L-10 (bisphenol-E cyanate ester resin); 2) a thermoplastic component made up of from 19 to 23 weight percent polyetherimide and from 4 to 8 weight percent polyamideimide; 3) from 8 to 12 weight percent FR 300 or similar phosphorous-containing cyanate ester resin; and 4) from 2 to 4 weight percent bisphenol sulfone. These particularly preferred resin compositions, when used as the resin matrix for composite material, provide peak and total OSU heat release rates that are well below the 65 kw-min/m$^2$ heat release rate maximums set by 14 C.F.R. 25.853(d) and the self-extinguishing time limit of 15 seconds set by 14 C.F.R. 25.853(a), while still retaining desired prepreg handling properties in accordance with the present invention. When these particularly preferred resins are used to make composite parts that form primary aircraft parts or structures, it is preferred that the fibrous reinforcement is made from carbon fibers and that the prepreg is subjected to post-curing.

If desired, small amounts of other thermoplastic may be used in combination with PEI or PAI. For example, in situations where the aircraft primary structure is not located in the interior of the aircraft, polyethersulfone (PES) and other sulfur containing thermoplastic materials may be added to supplement and/or replace a portion of the PEI in the thermoplastic blend. Amounts of PES or other sulfur containing thermoplastics should not form more that 25 weight percent of the "PEI" portion of the thermoplastic blend. Polyamide (PA) and other similar thermoplastics may be added to supplement and/or replace a portion of the PAI in the thermoplastic blend. Amounts of PA or other similar thermoplastics should not form more than 25 weight percent of the "PAI" portion of the thermoplastic blend.

Examples of practice are as follows:

EXAMPLE 1

A resin composition having the following formulation was prepared for use in forming the resin matrix of an exemplary composite material:

60.4 weight percent bisphenol-E cyanate ester resin (AroCy L-10)
10.0 weight percent phosphorous-containing cyanate ester resin (FR300)
20.7 weight percent polyetherimide (ULTEM 1000P)
6.0 weight percent polyamideimide (TORLON 4000TF)
2.9 weight percent bisphenol sulfone (BPS)

The liquid cyanate ester resin AroCy L-10 and PEI particles were mixed together at room temperature and heated to 110° C. for 60 minutes in order to completely dissolve the PEI particles. The mixture was cooled to 100° C. and PAI particles were added. The mixture was further cooled to 85° C. and FR-300 and BPS were added. The weight ratio of polyetherimide to polyamide for this example is 3.45:1. For all of the examples, TORLON TF powder was ground and sieved to provide PAI powder having an average particle size of 15 μm.

The matrix resin was used to form a test sample by impregnating 12 layers of AS4C 193AW plain weave carbon fiber fabric with the matrix resin films to provide a pre-preg that was 0.25 cm thick. The pre-preg contained 38 percent by weight resin matrix. The pre-preg was cured in an autoclave at 177° C. for 120 minutes to form a cured composite material. The cured composite material was cut into a test sample that was 150 cm×150 cm×0.25 cm. In addition, some of the cured composite material was post-cured at 200° C. for two hours in a convection oven. The post-cured composite material was cut into a post-cured test sample that was also 150 cm×150 cm×0.25 cm. Both the cured and post-cured samples were tested for OSU heat release rate in accordance with 14 CFR 25.853d, Appendix F, Part IV. The cured test sample had a peak OSU heat release rate of 64 kw-min/$m^2$ and a total OSU heat release rate of 23 kw-min/$m^2$. The post-cured sample had a maximum OSU heat release rate of 54 kw-min/$m^2$ and a total OSU heat release rate of 26 kw-min/$m^2$. As can be seen from this example, post-curing provides a substantial drop (−10 kw-min/$m^2$) in the peak OSU heat release rate while causing only a slight increase (+3 kw-min/$m^2$) in the total OSU heat release rate.

Both the cured and post-cured composite test samples were subjected to a 60 second vertical burn test to determine the self-extinguishing time in accordance with the modified Method F of BSS-7230 (Revision H). Both the cured and post-cured test samples had a self-extinguish time of 4 seconds.

EXAMPLE 2

Pre-preg was made in the same manner as Example 1 except that no phosphorous-containing cyanate ester resin (FR300) was included and the amount of bisphenol-E cyanate ester resin (AroCy L-10) was increased to 70.4 weight percent to make up for the missing FR300. The pre-preg was cured and post-cured in the same manner as Example 1 and test samples prepared in accordance with Example 1. The cured test sample had a peak OSU heat release rate of 77 kw-min/$m^2$ and a total OSU heat release rate of 64 kw-min/$m^2$. The post-cured sample had a peak OSU heat release rate of 69 kw-min/$m^2$ and a total OSU heat release rate of 20 kw-min/$m^2$. In accordance with the present invention, it is preferred that the composite be post-cured. As can be seen from this example, post-curing provides a significant drop in both maximum and total heat release rates as compared to the test sample that was not post-cured. In addition, one should include a sufficient amount of phosphorous-containing cyanate ester resin fire retardant in order to reach peak and total OSU heat release rates that are below 65 kw-min/$m^2$. For this exemplary composite material, FR300 should be added in an amount that would reduce the OSU peak and total heat release rates to below 65 kw-min/$m^2$ regardless of whether post-curing was used.

Both the cured and post-cured composite test samples were subjected to a 60 second vertical burn test to determine the self-extinguishing time in the same manner as Example 1. The cured sample had a self-extinguish time of 7 seconds and the post-cured test sample had a self-extinguish time of 6.5 seconds.

EXAMPLE 3

A resin composition having the following formulation was prepared for use in forming the resin matrix of an exemplary composite material:
- 67.1 weight percent bisphenol-E cyanate ester resin (AroCy L-10)
- 11.1 weight percent phosphorous-containing cyanate ester resin (FR300)
- 11.9 weight percent polyetherimide (ULTEM 1000P)
- 6.7 weight percent polyamideimide (TORLON 4000TF)
- 3.2 weight percent bisphenol sulfone (BPS)

Pre-preg was made in the same manner as Example 1. The weight ratio of polyetherimide to polyamide for this example is 1.78:1. The pre-preg was cured and post-cured in the same manner as Example 1. A test sample of the post-cured material was prepared in accordance with Example 1. The post-cured sample had a peak OSU heat release rate of 62 kw-min/$m^2$ and a total OSU heat release rate of 32 kw-min/$m^2$.

The post-cured composite test sample was subjected to a 60 second vertical burn test to determine the self-extinguishing time in the same manner as Example 1. The post-cured test sample had a self-extinguish time of 4.7 seconds.

EXAMPLE 4

A resin composition having the following formulation was prepared for use in forming the resin matrix of an exemplary composite material:
- 60.4 weight percent bisphenol-E cyanate ester resin (AroCy L-10)
- 12.9 weight percent phosphorous-containing cyanate ester resin (FR300)
- 20.7 weight percent polyetherimide (ULTEM 1000P)
- 6.0 weight percent polyamideimide (TORLON 4000TF)
- 0.0 weight percent bisphenol sulfone (BPS)

Pre-preg was made in the same manner as Example 1. The exemplary pre-preg was cured and post-cured in the same manner as Example 1. A test sample of the post-cured material was prepared in accordance with Example 1. The exemplary post-cured sample had a peak OSU heat release rate of 51 kw-min/$m^2$ and a total OSU heat release rate of 18 kw-min/$m^2$.

The post-cured composite test sample was subjected to a 60 second vertical burn test to determine the self-extinguishing time in the same manner as Example 1. The post-cured test sample had a self-extinguish time of 2.5 seconds.

COMPARATIVE EXAMPLE 1

A resin composition having the following formulation was prepared for use in forming the resin matrix of a comparative composite material:
- 50.0 weight percent bisphenol-E cyanate ester resin (AroCy L-10)
- 0.00 weight percent phosphorous-containing cyanate ester resin (FR300)
- 41.1 weight percent polyetherimide (ULTEM 1000P)
- 6.0 weight percent polyamideimide (TORLON 4000TF)
- 2.9 weight percent bisphenol sulfone (BPS)

Pre-preg was made in the same manner as Example 1. The weight ratio of polyetherimide to polyamide for this comparative example is 6.85:1, which is outside of the weight ratio range that was found to provide especially low OSU heat release rates as demonstrated by Examples 1-3. The comparative pre-preg was cured and post-cured in the same manner as Example 1 and test samples prepared in accordance with Example 1. The cured comparative test sample had a peak OSU heat release rate of 79 kw-min/m² and a total OSU heat release rate of 43 kw-min/m². The post-cured sample had a peak OSU heat release rate of 82 kw-min/m² and a total OSU heat release rate of 41 kw-min/m².

Both the cured and post-cured comparative composite samples were subjected to a 60 second vertical burn test to determine the self-extinguishing time in the same manner as Example 1. The cured sample had a self-extinguish time of 3.0 seconds and the post-cured test sample had a self-extinguish time of 6.0 seconds.

Post curing of the comparative sample did not result in any improvement in OSU heat release rates whereas in Example 2, post-curing produced substantial drops in both the peak and total OSU heat release rates.

COMPARATIVE EXAMPLE 2

A resin composition having the following formulation was prepared for use in forming the resin matrix of a comparative composite material:
  60.4 weight percent bisphenol-E cyanate ester resin (AroCy L-10)
  10.0 weight percent phosphorous-containing cyanate ester resin (FR300)
  26.7 weight percent polyetherimide (ULTEM 1000P)
  0.0 weight percent polyamideimide (TORLON 4000TF)
  2.9 weight percent bisphenol sulfone (BPS)

Pre-preg was made in the same manner as Example 1. The comparative pre-preg was cured and post-cured in the same manner as Example 1. A comparative test sample of the post-cured material was prepared in accordance with Example 1. The comparative post-cured sample had a peak OSU heat release rate of 70 kw-min/m² and a total OSU heat release rate of 43 kw-min/m².

The post-cured composite test sample was subjected to a 60 second vertical burn test to determine the self-extinguishing time in the same manner as Example 1. The post-cured test sample had a self-extinguish time of 4.7 seconds. When compared to Example 1, this comparative example shows that the deletion of polyamideimide from the matrix resin causes a substantial increase in the maximum and total OSU heat release values.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An uncured composite part comprising:
   a resin matrix comprising:
     50 to 80 weight percent of a cyanate ester resin component based on the total weight of said resin matrix, said cyanate ester resin component comprising one or more cyanate ester resins that do not contain phosphorous;
     10 to 40 weight percent of a thermoplastic blend based on the total weight of said resin matrix, said thermoplastic blend comprising polyetherimide and polyamideimide wherein the weight ratio of polyetherimide to polyamideimide is from 5:1 to 1:1;
     1 to 15 weight percent of a fire retardant agent based on the total weight of said resin matrix, said fire retardant agent comprising a phosphorous-containing cyanate ester resin;
     1 to 10 weight percent of a curative agent component based on the total weight of said resin matrix, said curative agent component comprising a curative agent for said cyanate ester component; and
   a fibrous reinforcement.

2. An uncured composite part according to claim 1 wherein the resin matrix comprises:
   55 to 65 weight percent of said cyanate ester resin component based on the total weight of said resin matrix;
   20 to 30 weight percent of said thermoplastic blend based on the total weight of said resin matrix;
   8 to 12 weight percent of said fire retardant agent based on the total weight of said resin matrix; and
   1 to 5 weight percent of said curative agent component based on the total weight of said resin matrix.

3. An uncured composite part according to claim 2 wherein the weight ratio of polyetherimide to polyamideimide is from 4:1 to 2:1.

4. An uncured composite part according to claim 1 wherein said curative agent for said cyanate ester component is selected from the group consisting of bisphenol sulfone and bisphenol A.

5. A cured composite part comprising an uncured composite part according to claim 1 wherein said resin matrix has been cured.

6. A cured composite part according to claim 5 wherein said cured composite part forms at least part of a primary structure of an aircraft.

7. An uncured composite part according to claim 1 wherein said fibrous reinforcement comprises unidirectional fibers.

8. An uncured composite part according to claim 1 wherein said cyanate ester resin that does not contain phosphorous is selected from the group of cyanate ester resins consisting of bisphenol-E cyanate ester resin, bisphenol-A cyanate ester resin, hexafluorobisphenol-A cyanate ester resin, tetramethylbisphenol-F cyanate ester resin, bisphenol-C cyanate ester resin, bisphenol-M cyanate ester resin, phenol novolac cyanate ester resin and dicyclopentadienyl-bisphenol cyanate ester resin.

9. An uncured composite part according to claim 1 wherein said phosphorous-containing cyanate ester resin comprises from 5 to 15 weight percent phosphorous based on the total weight of the phosphorous-containing cyanate ester resin.

\* \* \* \* \*